US010984315B2

(12) United States Patent
Zarar et al.

(10) Patent No.: US 10,984,315 B2
(45) Date of Patent: Apr. 20, 2021

(54) LEARNING-BASED NOISE REDUCTION IN DATA PRODUCED BY A NETWORK OF SENSORS, SUCH AS ONE INCORPORATED INTO LOOSE-FITTING CLOTHING WORN BY A PERSON

(71) Applicant: Microsoft Technology Licensing, LLC, Redmond, WA (US)

(72) Inventors: Shuayb M Zarar, Redmond, WA (US); Ivan Jelev Tashev, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 996 days.

(21) Appl. No.: 15/582,456

(22) Filed: Apr. 28, 2017

(65) Prior Publication Data

US 2018/0314937 A1  Nov. 1, 2018

(51) Int. Cl.
*G06N 3/04* (2006.01)
*G06N 3/08* (2006.01)

(52) U.S. Cl.
CPC ............ *G06N 3/08* (2013.01); *G06N 3/0445* (2013.01); *G06N 3/0454* (2013.01); *G06N 3/0472* (2013.01)

(58) Field of Classification Search
CPC .............................. G06N 3/0445; G06N 3/08
See application file for complete search history.

(56) References Cited

U.S. PATENT DOCUMENTS

| 4,752,896 A | 6/1988 | Matsumoto |
| 8,323,106 B2 | 12/2012 | Zalewski |
| 8,907,929 B2 | 12/2014 | Li et al. |
| 9,019,201 B2 | 4/2015 | Holmdahl et al. |
| 9,668,066 B1 | 5/2017 | Betts et al. |
| 9,911,209 B2 | 3/2018 | Beckman |
| 9,911,290 B1 | 3/2018 | Zalewski et al. |
| 10,042,038 B1 | 8/2018 | Lord |
| 2011/0096954 A1 | 4/2011 | Dahl |
| 2012/0001875 A1 | 1/2012 | Li et al. |
| 2012/0206339 A1 | 8/2012 | Dahl |
| 2014/0229168 A1 | 8/2014 | Pandya |

(Continued)

FOREIGN PATENT DOCUMENTS

| CN | 103559888 A | 5/2014 |
| CN | 104751855 A | 7/2015 |
| WO | 2008145952 A1 | 12/2008 |

OTHER PUBLICATIONS

Kim, Juhwan, Seokyong Song, and Son-Cheol Yu. "Denoising auto-encoder based image enhancement for high resolution sonar image." 2017 IEEE Underwater Technology (UT). IEEE, 2017. (Year: 2017).*

(Continued)

*Primary Examiner* — Hal Schnee (57) ABSTRACT

A facility for processing output from a network of mechanical sensors is described. The facility accesses time-series data outputted by the network of sensors. The facility applies to the accessed time-series data a trained autoencoder to obtain a version of the accessed time-series data in which noise present in the accessed time-series data is at least partially suppressed. The facility stores the obtained version of the accessed time-series data, such as in order to perform human activity recognition against the obtained version of the accessed time-series data.

20 Claims, 9 Drawing Sheets

(56) References Cited

U.S. PATENT DOCUMENTS

| | | | |
|---|---|---|---|
| 2015/0025880 | A1 | 1/2015 | Le roux et al. |
| 2015/0112670 | A1 | 4/2015 | Le roux et al. |
| 2015/0154035 | A1 | 6/2015 | Zepeniuk et al. |
| 2015/0243284 | A1 | 8/2015 | Guo et al. |
| 2016/0071526 | A1 | 3/2016 | Wingate et al. |
| 2016/0099008 | A1 | 4/2016 | Barker et al. |
| 2016/0111107 | A1 | 4/2016 | Erdogan et al. |
| 2016/0241346 | A1 | 8/2016 | Hoffman |
| 2016/0284346 | A1 | 9/2016 | Visser et al. |
| 2016/0300361 | A1 | 10/2016 | Xie et al. |
| 2016/0313801 | A1* | 10/2016 | Wagner ............... G09B 21/02 |
| 2017/0060254 | A1 | 3/2017 | Molchanov et al. |
| 2017/0150235 | A1 | 5/2017 | Mei et al. |
| 2017/0162194 | A1 | 6/2017 | Nesta et al. |
| 2017/0168158 | A1 | 6/2017 | Reining |
| 2017/0220923 | A1* | 8/2017 | Bae ...................... G06N 3/08 |
| 2017/0300124 | A1 | 10/2017 | Tashev et al. |
| 2018/0089531 | A1* | 3/2018 | Geva ................ A61B 5/04842 |
| 2018/0218261 | A1* | 8/2018 | Myara ................. H04W 12/12 |
| 2018/0240219 | A1* | 8/2018 | Mentl ................... G06T 5/002 |
| 2018/0254050 | A1 | 9/2018 | Tashev et al. |
| 2018/0276541 | A1* | 9/2018 | Studnitzer ........... G06N 3/0454 |
| 2018/0303381 | A1* | 10/2018 | Todd ..................... A61B 5/681 |
| 2019/0050640 | A1* | 2/2019 | Sarkar ............... G06K 9/00449 |
| 2019/0220691 | A1* | 7/2019 | Valpola .................. G06N 3/02 |
| 2020/0074227 | A1* | 3/2020 | Lan ....................... G06N 3/08 |
| 2020/0118423 | A1* | 4/2020 | Moura ................ G08G 1/0116 |

OTHER PUBLICATIONS

Wang, Lukun. "Recognition of human activities using continuous autoencoders with wearable sensors." Sensors 16.2 (2016): 189. (Year: 2016).*

Chaitanya, Chakravarty R. Alla, et al. "Interactive reconstruction of Monte Carlo image sequences using a recurrent denoising autoencoder." ACM Transactions on Graphics (TOG) 36.4 (2017): 1-12. (Year: 2017).*

Maas, Andrew, et al. "Recurrent neural networks for noise reduction in robust ASR." (2012). (Year: 2012).*

Patraucean, Viorica, Ankur Handa, and Roberto Cipolla. "Spatio-temporal video autoencoder with differentiable memory." arXiv preprint arXiv:1511.06309 (2015). (Year: 2015).*

"Non Final Office Action Issued in U.S. Appl. No. 15/640,327", dated May 10, 2019, 13 Pages.

"Elliptic Labs", Retrieved From: http://www.ellipticlabs.com/home/, Retrieved on: Mar. 23, 2017, 6 Pages.

"Opportunity human activity recognition challenge dataset 2012", Retrieved From: https://web.archive.org/web/20170404100301/http://www.opportunity-project.eu/challengeDataset, Retrieved on: Jan. 1, 2017, 3 Pages.

"Ultrasonic Gesture Recognition", Retrieved From: https://swarmlab.eecs.berkeley.edu/projects/4684/ultrasonic-gesture-recognition, Retrieved on: Mar. 23, 2017, 2 Pages.

"Final Office Action Issued in U.S. Appl. No. 15/626,016", dated Jun. 12, 2018, 31 Pages.

"Non Final Office Action Issued in U.S. Appl. No. 15/626,016", dated Mar. 30, 2018, 26 Pages.

"Notice of Allowance Issued in U.S. Appl. No. 15/626,016", dated Oct. 2, 2018, 16 Pages.

Alinia, P, et al., "Impact of sensor misplacement on estimating metabolic equivalent of task with wearables", In Proceedings of 2015 IEEE 12th International Conference on Wearable and Implantable Body Sensor Networks (BSN), Jun. 9, 2015, 6 Pages.

Atmel, "ATmega32U4 low power 8-bit AVR RISC microcontroller", Retrieved From: http://www.atmel.com/devices/atmega32u4.aspx, Retrieved Date: Jan. 1, 2017, 3 Pages.

Baby, et al., "Coupled Dictionary Training for Exemplar-Based Speech Enhancement", In Proceedings of IEEE International Conference on Acoustics, Speech and Signal Processing, May 4, 2004, pp. 2883-2887.

Baraniuk, R G., et al., "Applications of sparse representation and compressive sensing", In Proceedings of the IEEE, vol. 98 , Issue: 6, Jun. 2010, pp. 906-909.

Bergh, et al., "Combining RGB and ToF Cameras for Real-Time 3D Hand Gesture Interaction", In Proceedings of 2011 IEEE Workshop on Applications of Computer Vision (WACV), Jan. 5, 2011, 7 Pages.

Bergmann, J H. M . . . , et al., "An attachable clothing sensor system for measuring knee joint angles", In Proceedings of IEEE Sensors Journal, vol. 13 , Issue: 10, Oct. 2013, pp. 4090-4097.

Bhiksha, Raj, et al., "Ultrasonic Doppler Sensing in HCI", In Proceedings of IEEE Pervasive Computing, vol. 11 , Issue: 2, Feb. 1, 2012, pp. 24-29.

Cao, H, et al., "Enabling technologies for wireless body area networks: A survey and outlook", In Proceedings of IEEE Communications Magazine, vol. 47, Issue: 12, Dec. 2009, pp. 84-93.

Catrysse, M, et al., "Towards the integration of textile sensors in a wireless monitoring suit", In Journal of Sensors and Actuators A: Physical, vol. 114, Issue 2, Sep. 2004, pp. 302-311.

Chavarriaga, R, et al., "The opportunity challenge: A benchmark database for on-body sensor-based activity recognition", In Journal of Pattern Recognition Letters, vol. 34, Issue 15, Nov. 2013, pp. 2033-2042.

Chen, M, et al., "Body area networks: A survey", In Journal of Mobile Networks and Applications, vol. 16, Issue 2, Apr. 2011, pp. 171-193.

Chen, et al., "Speaker Recognition of Noisy Short Utterance Based on Speech Frame Quality Discrimination and Three-stage Classification Model", In International Journal of Control and Automation, vol. 8, Issue 3, Mar. 2015, pp. 135-146.

Chochai, et al., "Real-time gesture recognition with finger naming by RGB camera and IR depth sensor", In Proceedings of IEEE International Conference on Robotics and Biomimetics (ROBIO), Dec. 5, 2014, pp. 931-936.

Das, Amit, et al., "Ultrasound based gesture recognition", In Proceedings of 2017 IEEE International Conference on Acoustics, Speech and Signal Processing (ICASSP), Mar. 5, 2017, pp. 406-410.

Dokmanic, Ivan, et al., "Hardware and algorithms for ultrasonic depth imaging", in Proceedings of 2014 IEEE International Conference on Acoustics, Speech and Signal Processing (ICASSP), May 4, 2014, pp. 6702-6706.

Eleni, Tsironi, et al., "Gesture Recognition with a Convolutional Long Short-Term Memory Recurrent Neural Network", In Proceedings of the European Symposium on Artificial Neural Networks, Computational Intelligence and Machine Learning (ESANN), Apr. 27, 2016, 6 Pages.

Enokibori, Y, et al., "A study of intermittent adjustment to resist displacement of smart garment using posture-stable daily actions", In Proceedings of UbiComp/ISWC Adjunct, Sep. 7, 2015, 4 Pages.

Ephraim, et al., "Speech enhancement using a minimum-mean square error short-time spectral amplitude estimator", In Journal of IEEE Transactions on Acoustics, Speech, and Signal Processing, vol. 32, Issue 6, Dec. 1984, pp. 1109-1121.

Fan, et al., "Speech enhancement using segmental nonnegative matrix Factorization", In Proceedings of IEEE International Conference on Acoustics, Speech and Signal Processing, May 9, 2014, pp. 4483-4487.

Freund, Yoav, "A Decision-Theoretic Generalization of On-Line Learning and an Application to Boosting", In Journal of Computer and System Sciences, vol. 55, Issue 1, Aug. 1997, pp. 119-139.

Garofolo, J S., et al., "TIMIT acoustic-phonetic continuous speech corpus", In Proceedings of Linguistic Data Consortium, Jan. 1993, 95 Pages.

Gioberto, G, et al., "Garment positioning and drift in garment-integrated wearable sensing", In Proceedings of 2012 16th International Symposium on Wearable Computers, Jun. 18, 2012, pp. 64-71.

Grais, E M., et al., "Initialization of nonnegative matrix factorization dictionaries for single channel source separation", In Proceedings of 21st Signal Processing and Communications Applications Conference (SIU), Apr. 24, 2013, pp. 1-4.

(56) References Cited

OTHER PUBLICATIONS

Grais, E M., et al., "Spectro-temporal post-smoothing in NMF based single-channel source separation", In Proceedings of Proceedings of the 20th European Signal Processing Conference (EUSIPCO), Aug. 27, 2012, pp. 584-588.
Greene, D, et al., "Ensemble non-negative matrix factorization methods for clustering protein—protein interactions", In Journal of Bioinformatics, vol. 24, Issue 15, Aug. 1, 2008, pp. 1722-1728.
Hirsch, et al., "The Aurora experimental framework for the performance evaluation of speech recognition systems under noisy conditions", In Proceedings of Automatic Speech Recognition: Challenges for the new Millenium ISCA Tutorial and Research Workshop, Sep. 18, 2000, 8 Pages.
Hoyer, P O., "Non-negative matrix factorization with sparseness constraints", In the Journal of Machine Learning Research, vol. 5, Nov. 2004, pp. 1457-1469.
Incel, O D., "Analysis of movement, orientation and rotation-based sensing for phone placement recognition", In Journal of Sensors (Basel), vol. 15, Issue 10, Oct. 5, 2015, pp. 25474-25506.
Invensense, "MPU-9150: Nine-axis MEMS motion tracking device", Retrieved From: https://www.invensense.com/products/motion-tracking/9-axis/mpu-9150/, Retrieved on: Jan. 1, 2017, 5 Pages.
Jaureguiberry, X, et al., "Adaptation of source-specific dictionaries in non-negative matrix factorization for source separation", In Proceedings of IEEE International Conference on Acoustics, Speech and Signal Processing (ICASSP), May 22, 2011, pp. 5-8.
Kannan, et al., "A High-Performance Parallel Algorithm for Non-negative Matrix", In Proceedings of the 21st ACM SIGPLAN Symposium on Principles and Practice of Parallel Programming, Mar. 12, 2016, 11 Pages.
Kapuscinski, et al., "Recognition of Hand Gestures Observed by Depth Cameras", In Proceedings of International Journal of Advanced Robotic Systems, Apr. 14, 2015, pp. 1-15.
Kim, Y D., et al., "A method of initialization for non-negative matrix factorization", In Proceedings of IEEE International Conference on Acoustics, Speech and Signal Processing—ICASSP '07, Apr. 15, 2007, pp. 533-537.
Kim, M, et al., "Mixtures of local dictionaries for unsupervised speech enhancement", In Proceedings of IEEE Signal Processing Letters, vol. 22 , Issue: 3, Mar. 2015, pp. 293-297.
King, B, et al., "Single-channel source separation using simplified-training complex matrix factorization", In Proceedings of IEEE International Conference on Acoustics, Speech and Signal Processing, Mar. 14, 2010, pp. 4206-4209.
Kingma, D P., et al., "Auto-encoding variational bayes", In Proceedings of International Conference Learning and Representation, Dec. 2013, pp. 13-21.
Koitka, et al., "nmfgpu4R: GPU-Accelerated Computation of the Non-Negative Matrix Factorization (NMF) Using CUDA Capable Hardware", In the R Journal, vol. 8, Issue 2, Dec. 2016, pp. 1-11.
Kunze, K, et al., "Sensor placement variations in wearable activity recognition", In Proceedings of IEEE Pervasive Computing, vol. 13 , Issue: 4, Oct. 2014, pp. 32-41.
Lapinski, M, et al., "A distributed wearable, wireless sensor system for evaluating professional baseball pitchers and batters", In Proceedings of 2009 International Symposium on Wearable Computers, Sep. 4, 2009, 9 Pages.
Lee, D D., et al., "Algorithms for nonnegative matrix factorization", In Proceedings of the 13th International Conference on Neural Information Processing Systems, Dec. 2001, pp. 535-541.
Lee, Y D., et al., "Wireless sensor network based wearable smart shirt for ubiquitous health and activity monitoring", In Journal of Sensors and Actuators B: Chemical, vol. 140, Issue 2, Jul. 2009, pp. 390-395.
Li, D, et al., "Boosting accuracy of attribute prediction via SVD and NMF of instance-attribute matrix", In Proceedings of Pacific Rim Conference on Multimedia, Dec. 15, 2015, pp. 466-476.
Liolios, C, et al., "An overview of body sensor networks in enabling pervasive healthcare and assistive environments", In Proceedings of the 3rd International Conference on PErvasive Technologies Related to Assistive Environments, Jun. 23, 2010, 10 Pages.
Liu, et al., "SoundSense: 3D Gesture Sensing using Ultrasound on Mobile Devices", Retrieved From: https://mrorz.github.io/files/soundsense.pdf, Retrieved on: Mar. 23, 2017, 7 Pages.
Manninia, A, et al., "Accelerometer based recognition of the placement sites of a wearable sensor", In Journal of Pervasive and Mobile Computing, vol. 21, Aug. 1, 2015, pp. 62-74.
Mathie, M J., et al., "Accelerometry: Providing an integrated, practical method for long-term, ambulatory monitoring of human movement", In Proceedings of Physiological Measurement, vol. 25, Issue: 2, May 2004, 21 Pages.
Mejia-Roa, et al., "NMF-mGPU: non-negative matrix factorization on multi-GPU systems", In Journal of BMC Bioinformatics, Feb. 13, 2015, pp. 1-12.
Mohammadiha, et al., "Supervised and unsupervised speech enhancement using nonnegative matrix factorization", In Journal of IEEE Transactions on Audio, Speech, and Language Processing, vol. 21, No. 10, Oct. 21, 2013, pp. 1-12.
Mohammed, Shoaib, et al., "A Statistical Approach to Semi-Supervised Speech Enhancement With Low-Order Non-Negative Matrix Factorization", In Proceedings of IEEE International Conference on Acoustics, Speech and Signal Processing (ICASSP), Mar. 5, 2017, 5 Pages.
Mohammed, Shoaib, et al., "Unsupervised Deep Representation Learning to Remove Motion Artifacts in Free-mode Body Sensor Networks", In Proceedings of 2017 IEEE 14th International Conference on Wearable and Implantable Body Sensor Networks (BSN), May 9, 2017, 6 Pages.
Molchanov, et al., "Multi-sensor System for Driver's Hand-Gesture Recognition", In Proceedings of 2015 11th IEEE International Conference and Workshops on Automatic Face and Gesture Recognition (FG), May 4, 2015, 8 Pages.
Moore, S T., et al., "Long-term monitoring of gait in parkinson's disease", In Journal of Gait Posture, vol. 26, Issue 2, Jul. 2007, 8 Pages.
Mujibiya, et al., "The Sound of Touch: On-body Touch and Gesture Sensing Based on Transdermal Ultrasound Propagation", In Proceedings of the ACM international conference on Interactive tabletops and surfaces, Oct. 6, 2013, pp. 189-198.
Mysore, G J., "A block sparsity approach to multiple dictionary learning for audio modeling", In Proceedings of International Workshop on Sparsity, Dictionaries, Projections, Machine Learning, and Signal Processing, Jun. 2012, 4 Pages.
Mysore, G J., et al., "A non-negative approach to semi-supervised separation of speech from noise with the use of temporal dynamics", In Proceedings of IEEE International Conference on Acoustics, Speech and Signal Processing (ICASSP), May 2011, pp. 17-20.
Nordic Semiconductors, "nRF8001 bluetooth low energy connectivity IC", Retrieved From: https://www.nordicsemi.com/Products/, Retrieved Date: Jan. 1, 2017, 7 Pages.
Ordonez, F J., et al., "Deep convolutional and LSTM recurrent neural networks for multimodal wearable activity recognition", In Journal of Sensors, vol. 16, Issue 1, Jan. 18, 2016, pp. 115-130.
Palacios, et al., "Human-Computer Interaction Based on Hand Gestures Using RGB-D Sensors", In Journal of Sensors, vol. 13, Issue 9, Sep. 6, 2013, 27 Pages.
"International Search Report and Written Opinion Issued in PCT Application No. PCT/US2018/019796", dated Aug. 30, 2018, 18 Pages.
"International Search Report and Written Opinion Issued in PCT Application No. PCT/US2018/019796", dated Aug. 7, 2018, 17 Pages.
Periverzov, et al., "3D Imaging for Hand Gesture Recognition: Exploring the Software-Hardware Interaction of Current Technologies", In Journal of 3D Research, vol. 3, Issue 3, Sep. 2012, pp. 1-30.
Roux, J L., et al., "Ensemble learning for speech enhancement", In proceedings of IEEE Workshop on Applications of Signal Processing to Audio and Acoustics, Oct. 20, 2013, pp. 1-4.
Roux, J L., et al., "Sparse NMF—half-baked or well done?", In Proceedings of Mitsubishi Electric Research Laboratories (MERL), Rep. No. TR2015-023, Mar. 2015, 23 Pages.

(56) References Cited

OTHER PUBLICATIONS

Rusu, C, et al., "Perceptual evaluation of speech quality (PESQ): A new method for speech quality assessment of telephone networks and codecs", In Proceedings of 2001 IEEE International Conference on Acoustics, Speech, and Signal Processing, May 7, 2001, 4 Pages.

Sigg, et al., "Speech Enhancement Using Generative Dictionary Learning", In Proceedings of IEEE Transactions on Audio, Speech, and Language Processing, vol. 20, Issue 6, Aug. 2012, pp. 1698-1712.

Sprechmann, et al., "Supervised Non-Euclidean Sparse Nmf via Bilevel Optimization With Applications to Speech Enhancement", In Proceedings of 4th Joint Workshop on Hands-free Speech Communication and Microphone Arrays, May 12, 2014, pp. 11-15.

St Microelectronics, "LSM9DSO iNEMO inertial module:3D accelerometer, 3D gyroscope, 3D magnetometer", Retrieved From: https://www.st.com/resource/en/datasheet/lsm9ds1.pdf, Retrieved on: Jan. 1, 2017, 72 Pages.

Sun, D L., et al., "Universal speech models for speaker independent single channel source separation", In Proceedings of IEEE International Conference on Acoustics, Speech and Signal Processing, May 2013, pp. 141-145.

Texas Instruments, "TCA9548A: Low-voltage 8-channel I2C switch", Retrieved From: http://www.ti.com/product/TCA9548A, Retrieved Date: Jan. 1, 2017, 3 Pages.

Varga, A, et al., "Assessment for automatic speech recognition: II. NOISEX-92: A database and an experiment to study the effect of additive noise on speech recognition systems", In Proceedings of Speech Communication, vol. 12, Issue 3, Jul. 1993, pp. 247-251.

Vincent, et al., "Performance measurement in blind audio source separation", In Journal of IEEE Transactions on Audio, Speech, and Language Processing, vol. 14, Issue 4, Jul. 2006, pp. 1462-1469.

Virtanen, T, "Monaural sound source separation by nonnegative matrix factorization with temporal continuity and sparseness criteria", In proceedings of IEEE Transactions on Audio, Speech, and Language Processing, vol. 15, Issue: 3, Mar. 2007, pp. 1066-1074.

Wainwright, M J., et al., "Graphical models, exponential families, and variational inference", In Journal of Foundations and Trends in Machine Learning, vol. 1, Issue 1-2, Jan. 2008, pp. 1-305.

Weninger, et al., "Non-negative matrix factorization for highly noise-robust asr:To enhance or to recognize?", In Proceedings of IEEE International Conference on Acoustics, Speech and Signal Processing, Mar. 25, 2012, pp. 4681-4684.

Wild, S, et al., "Improving nonnegative matrix factorizations through structured initialization", In Proceedings of Pattern Recognition, vol. 37, Issue 11, Nov. 2004, pp. 2217-2232.

Xue, Y, et al., "Clustering-based initialization for non-negative matrix factorization", In Proceedings of Applied Mathematics and Computation, vol. 205, Issue 2, Nov. 15, 2008, pp. 525-536.

Zhang, Z, et al., "A survey of sparse representation: Algorithms and applications", In Proceedings of IEEE Access, vol. 3, May 2015, pp. 490-530.

Zheng, Z, et al., "Initialization enhancer for non-negative matrix factorization", In Proceedings of Engineering Applications of Artificial Intelligence, vol. 20, Issue 1, Feb. 2007, pp. 101-110.

"Final Office Action Issued in U.S. Appl. No. 15/640,327", dated Jul. 16, 2019, 13 Pages.

\* cited by examiner

LEARNING-BASED NOISE REDUCTION IN DATA PRODUCED BY A NETWORK OF SENSORS, SUCH AS ONE INCORPORATED INTO LOOSE-FITTING CLOTHING WORN BY A PERSON

BACKGROUND

In human gesture and activity recognition, gestures or activities performed by a person are automatically inferred. In some cases, such human gesture and activity recognition is performed with respect to data generated by a number of inertial measurement units that are tightly bound to a human body using individual straps, and/or by incorporating them into snugly-fitting clothing. A group of sensors secured to different parts of the body in this way is sometimes referred to as a "constrained body-sensor network."

SUMMARY

This summary is provided to introduce a selection of concepts in a simplified form that are further described below in the Detailed Description. This summary is not intended to identify key factors or essential features of the claimed subject matter, nor is it intended to be used to limit the scope of the claimed subject matter.

A facility for processing output from a network of mechanical sensors is described. The facility accesses time-series data outputted by the network of sensors. The facility applies to the accessed time-series data a trained autoencoder to obtain a version of the accessed time-series data in which noise present in the accessed time-series data is at least partially suppressed. The facility stores the obtained version of the accessed time-series data, such as in order to perform human activity recognition against the obtained version of the accessed time-series data.

DETAILED DESCRIPTION

The inventors have recognized that using constrained body-sensor networks ("cBSN") to perform human gesture and activity recognition ("HAR") can impose significant hardships on the subject, ultimately lessening the usefulness of the results. For example, a cBSN may feel uncomfortable to the subject, particularly if worn for a long period of time. In some cases, this discomfort may prevent a subject from wearing some or all of the cBSN, such as during sleep. The tightness with which cBSN are attached may also constrain the subject's range of motion in certain respects, limiting or otherwise altering the human motion sought to be measured and analyzed. Also, the subject may prefer to wear conventional clothing. All of these factors reduce the likelihood that a cBSN will be faithfully worn by particular subjects.

The inventors have predicted that body sensor networks incorporated into more conventional loose-fitting clothing ("free-mode body-sensor networks," "fmBSNs") would, on average, be more readily worn by subjects, with less discomfort, for longer periods, than cBSNs.

The inventors have also recognized, however, that the ability and tendency of sensors in a fmBSN to move relative to points on the subject's body as a result of the subject's motion introduces significant noise—also known as "motion artifacts—into the data produced by the fmBSN. The inventors have further recognized that conventional techniques for performing HAR have significant sensitivity to this noise, such that HAR performed on the output of a fmBSN produces meaningfully less accurate results than HAR performed on the output of a cBSN.

In response to this recognition, the inventors have conceived and reduced to practice a software and/or hardware facility for reducing the motion artifacts in data generated by sensor networks ("the facility"). In some embodiments, the output of a fmBSN is processed by the facility, then subjected to HAR. In various embodiments, the fmBSN is worn by subjects such as humans or other animals.

In some embodiments, the facility reduces the motion artifacts in the fmBSN output or other sensor signal by applying an artifact-reduction neural network designed and trained for this purpose. In some embodiments, this artifact-reduction neural network is an autoencoder, such as a variational autoencoder. In some embodiments, the artifact-reduction neural network includes a spatial component for encoding and decoding spatial aspects of the sensor signal, which is discrete from a temporal component for encoding and decoding time-based aspects of the sensor signal. In some embodiments, the spatial component comprises one or more contiguous groups of neuron layers in the artifact-reduction neural network, while the temporal component comprises one or more separate groups of neuron layers. In some embodiments, the facility first applies a convolutional portion of the spatial component to encode spatial aspects of the signal; the facility then applies an interconnected encoding-memory portion of the temporal component to encode temporal aspects of the signal, to obtain a latent space representation of the signal, at a much lower level of complexity than the original signal; the facility then applies an interconnected decoding-memory portion of the temporal component to decode temporal aspects of the signal present in the latent space representation; finally, the facility applies a deconvolutional portion of the spatial component to decode spatial aspects of the signal present in the latent space representation. In some embodiments, the facility uses one or more convolutional neural networks as the spatial component. In some embodiments, the facility uses one or more recurrent neural networks as the temporal component, such as one or more long short-term memory neural networks or one or more simple recurrent networks. In some embodiments, the facility uses an artifact-reduction neural network combining a convolutional neural network as a spatial component with a long short-term memory neural network as a temporal component; such artifact-reduction neural networks are sometimes called "deconvolutional sequence-to-sequence autoencoders" ("DSTSAEs").

In some embodiments, the facility automatically identifies channels of the sensor signal that typically have less significant levels of artifacts or other noise, and omits these from processing by the artifact-reduction neural network.

In some embodiments, the facility performs HAR on fmBSN output processed by the facility to reduce motion artifacts and/or other noise using a deep convolutional long short-term memory ("DCLSTM") neural network designed and trained for this purpose.

By performing in some or all of these ways, the facility makes HAR more accurate with respect to motion data produced by fmBSNs. This makes fmBSNs a significantly more viable basis for HAR, and for more challenging versions of HAR, such as HAR that recognizes actions from among a large number of candidate human actions, HAR that recognizes candidate human actions that are similar in many respects, etc.

Also, by performing in some or all of the ways described above, the facility meaningfully reduces the hardware resources needed to effectively perform HAR, for example, reducing the number of processing cycles needed to perform HAR. This allows programs performing HAR against sensor data processed by the facility to execute on computer systems that have less storage and processing capacity, occupy less physical space, consume less energy, produce less heat, and are less expensive to acquire and operate. Also, such a computer system can perform HAR with less latency, in some cases producing a better user experience.

Figure 1:
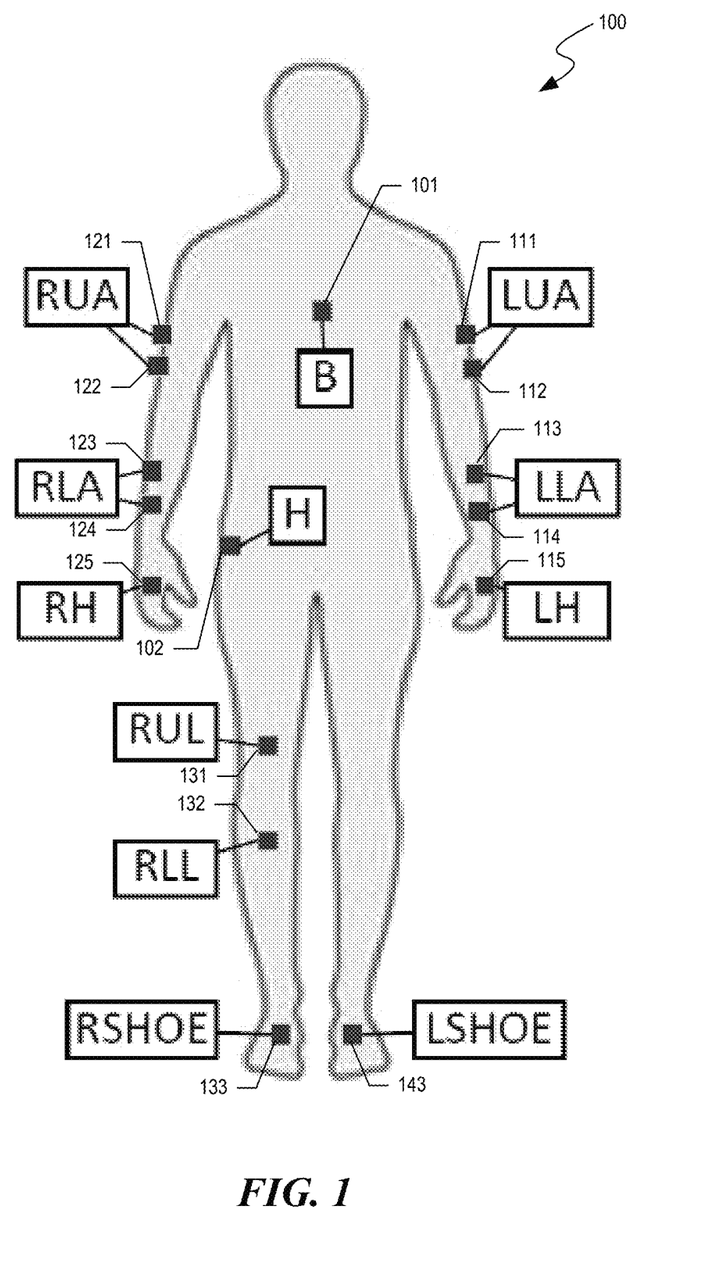
FIG. 1 is a human figure diagram showing points on a human body near which sensors such as inertial measurement units are, in some embodiments, incorporated in one or more garments, such as conventional, loose-fitting garments.

FIG. 1 is a human figure diagram showing points on a human body near which sensors such as inertial measurement units are, in some embodiments, incorporated in one or more garments, such as conventional, loose-fitting garments. The drawing 100 shows a back sensor 101, hip sensor 102, left upper-arm sensors 111 and 112, left lower-arm sensors 113 and 114, left hand sensor 115, right upper-arm sensors 121 and 122, right lower-arm sensors 123 and 124, right hand sensor 125, right upper-leg sensor 131, right lower-leg sensor 132, right shoe sensor 133, and left shoe sensor 143. Those skilled in the art will recognize that more or fewer sensors may be used, sensors may be placed in different locations, etc. Furthermore, sensors may be incorporated in the garments at particular locations without regard for the correspondence of these locations on the garment to particular locations on the human subject. In some embodiments, the facility omits to perform artifact-reduction processing on the data produced by certain of these sensors, such as the right shoe sensor, the left shoe sensor, the left-hand sensor, and the right-hand sensor. In some cases, the facility performs automatic processing to identify the sensors that produce data having relatively minor artifacts, and for which processing by the artifact-reduction neural network is to be omitted.

Figure 2:
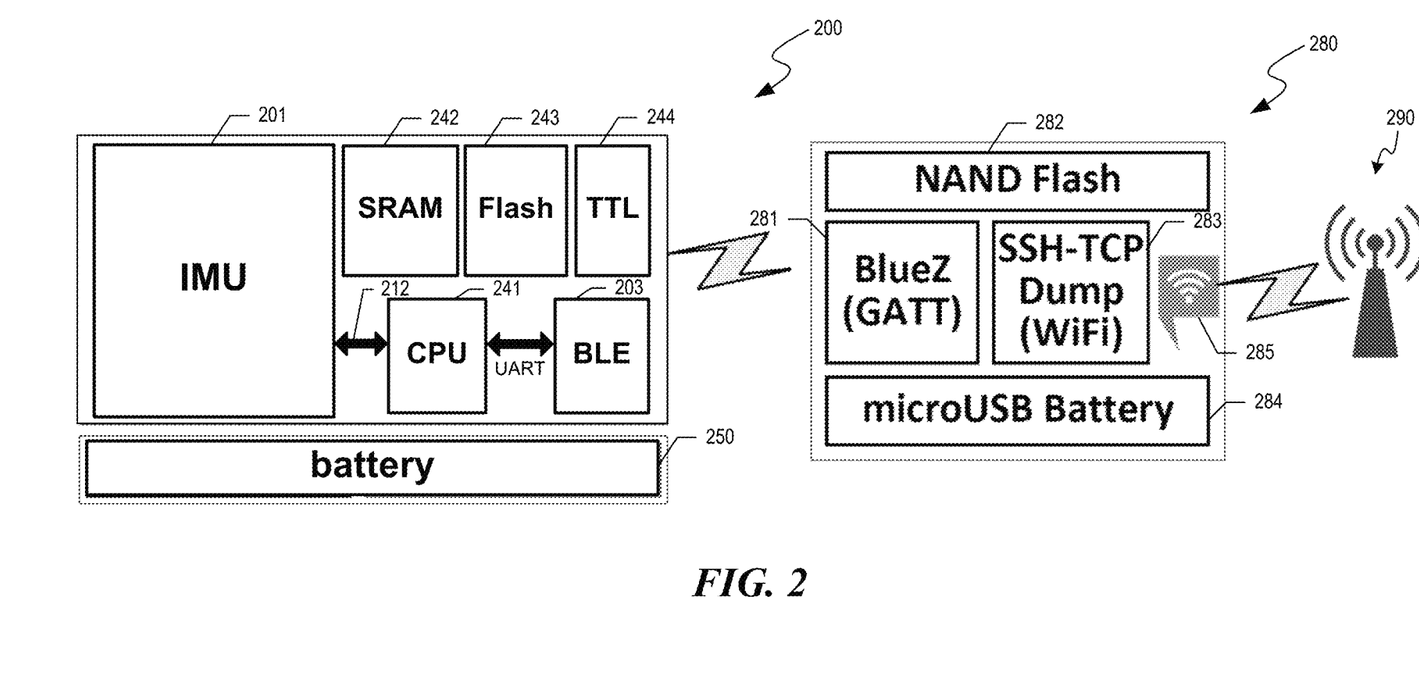
FIG. 2 is a hardware diagram showing hardware elements used by the facility to collect and provide sensor data in some embodiments.

FIG. 2 is a hardware diagram showing hardware elements used by the facility to collect and provide sensor data in some embodiments. A sensor unit 200 is attached to clothing to be worn by a subject, such as by sewing it to the clothing, sewing between a fabric patch and the clothing, attaching it to the clothing by adhesive, attaching it to the clothing with staples or clips, etc. In some embodiments, several sensor units are attached to different locations in the same clothing outfit, to be worn simultaneously. The sensor unit includes an inertial measurement unit ("IMU"), which reports on its own motion. In some embodiments, the IMU reports such information as specific force, angular rate, and magnetic field, using, for example, accelerometers, gyroscopes, and/or magnetometers. In some embodiments, the IMU is part number LSM9DS0, available from ST Microelectronics. Information produced by the IMU is received by a CPU 241, such as the ATmega32U4 microcontroller available from Atmel Corp. The CPU makes use of a radio, such as a Bluetooth LE ("BLE") radio—such as the nRF8001 BLE radio available from Nordic Semiconductor—to transmit the information from the IMU to a gateway unit 280. In some embodiments, the sensor unit also includes volatile memory 242, such as SRAM; non-volatile memory 243, such as Flash; and transistor-to-transistor logic ("TTL") 244. The sensor unit also includes a battery 250.

The gateway unit 280 aggregates data sent by all of the sensor units incorporated into a single clothing outfit. In various embodiments, the gateway unit is carried with the subject in a variety of ways, such as in a conventional pocket of one of the garments; enclosed in a specialized pocket in one of the garments; carried in a backpack; attached with a strap; etc. The gateway unit includes a BLE radio component 281—such as a Raspberry Pi 3 model B single-board computer available from Raspberry Pi Foundation—to receive sensor data from the sensor units. The gateway unit collects this information in persistent memory 282, such as NAND flash. A secure WiFi radio 283/285 transmits the sensor data collected in the non-volatile memory to a base unit 290. The gateway unit also has a battery 284. The base unit securely forwards the sensor data it receives to a server for long-term storage and analysis, such as by other portions of the facility.

In some embodiments, the facility performs additional processing on the data produced by the sensor network, such as in the server, or in a computing device of various other types. For example, in some embodiments, for each signal channel, the facility uses timestamps from the fmBSN and a cBSN to do sample alignment with delaying and correlation of signal segments. In some embodiments, the facility drops corrupted packets and fills in missing BLE data-payload using linear interpolation. In some embodiments, the facility uses mean-absolute-deviation (MAD) [median $(|x_i-\text{median}(x_i)|)$] to reject outliers, followed by resampling to 30 Hz (such as to match the Opportunity sampling rate) and interpolation. In some embodiments, the facility uses the difference between cBSN and fmBSN signals to extract motion artifact data. In some embodiments, the facility further rescales this processed sensor data.

Figure 3:
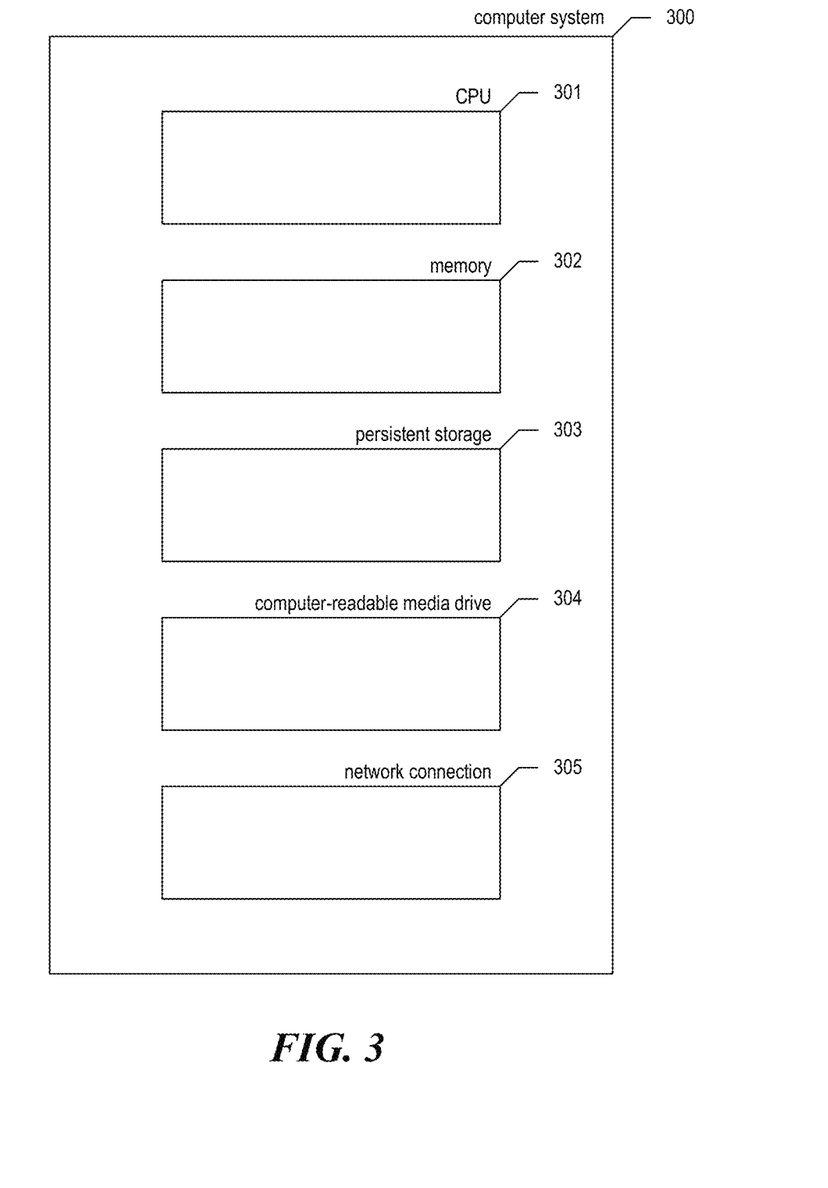
FIG. 3 is a block diagram showing some of the components typically incorporated in at least some of the computer systems and other devices on which the facility operates.

FIG. 3 is a block diagram showing some of the components typically incorporated in at least some of the computer systems and other devices on which the facility operates. In various embodiments, these computer systems and other devices 300 can include server computer systems, desktop computer systems, laptop computer systems, netbooks, mobile phones, personal digital assistants, televisions, cameras, automobile computers, electronic media players, etc. In various embodiments, the computer systems and devices include zero or more of each of the following: a central processing unit ("CPU") 301 for executing computer programs; a computer memory 302 for storing programs and data while they are being used, including the facility and associated data, an operating system including a kernel, and device drivers; a persistent storage device 303, such as a hard drive or flash drive for persistently storing programs and data; a computer-readable media drive 304, such as a floppy, CD-ROM, or DVD drive, for reading programs and data stored on a computer-readable medium; and a network connection 305 for connecting the computer system to other computer systems to send and/or receive data, such as via the Internet or another network and its networking hardware, such as switches, routers, repeaters, electrical cables and optical fibers, light emitters and receivers, radio transmitters and receivers, and the like. While computer systems configured as described above are typically used to support the operation of the facility, those skilled in the art will appreciate that the facility may be implemented using devices of various types and configurations, and having various components.

Figure 4:
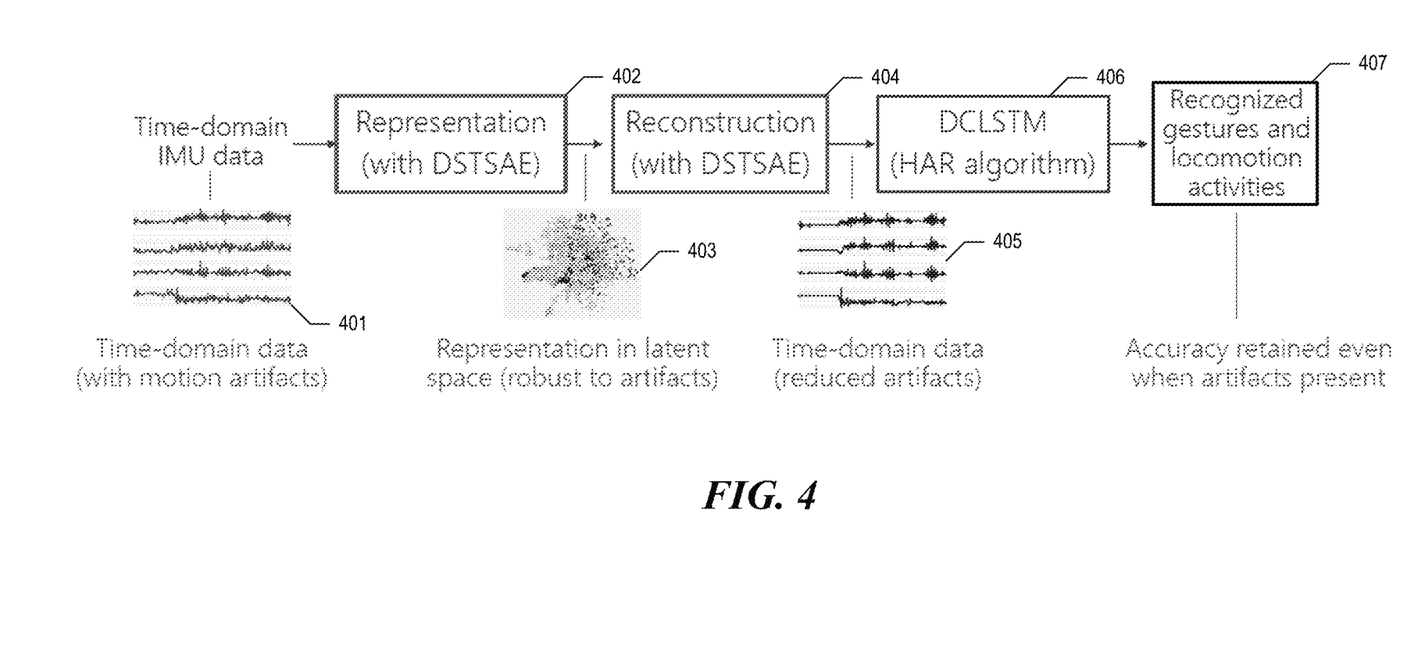
FIG. 4 is a data flow diagram showing the processing of the sensor data performed by the facility in some embodiments.

FIG. 4 is a data flow diagram showing the processing of the sensor data performed by the facility in some embodiments. The facility begins with time-indexed sensor data 401 produced by sensors. In some embodiments, each channel in the time-series data corresponds to a different sensor unit, to a different sensor, and/or to a different output of a sensor. This original time-series data is subjected to a first portion of the artifact-reduction neural network, which reduces the original time-series data to a simpler representation 403 in latent space. This representation in latent space is subjected to a second portion 404 of the artifact-reduction neural network to obtain a reconstituted version 405 of the time-indexed sensor data, in which the motion artifacts are reduced. The facility goes on to subject this reconstituted time-series data to a HAR process 406, to obtain recognized human activities 407.

Figure 5:
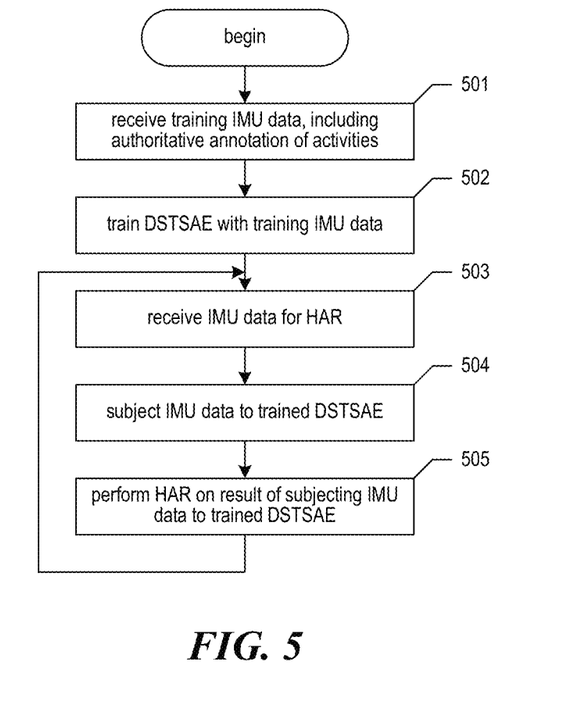
FIG. 5 is a flow diagram showing a process performed by the facility in some embodiments to process sensor data.

FIG. 5 is a flow diagram showing a process performed by the facility in some embodiments to process sensor data. In act 501, the facility receives original sensor data—together with an authoritative annotation of the human activities it reflects—to use in training neural networks. In act 502, the facility trains the artifact-reduction neural network using the sensor data received in act 501. In some embodiments (not shown), the same or different authoritatively-annotated sensor data is processed through the trained artifact-reduction neural network to train a neural network for performing HAR, such as a DSTSAE for performing HAR. In act 503, the facility receives sensor data on which HAR is to be performed. In act 504, the facility receives the sensor data received in act 503 to the artifact-reduction neural network that was trained in act 502. In act 505, the facility performs HAR on the version of the sensor data outputted by the artifact-reduction neural network, such as by subjecting it to a trained DSTSAE. After act 505, the facility continues in act 503 to received additional original sensor data on which HAR is to be performed.

Those skilled in the art will appreciate that the acts shown in FIG. 5 and in each of the flow diagrams discussed below may be altered in a variety of ways. For example, the order of the acts may be rearranged; some acts may be performed in parallel; shown acts may be omitted, or other acts may be included; a shown act may be divided into sub acts, or multiple shown acts may be combined into a single act, etc.

Figure 6:
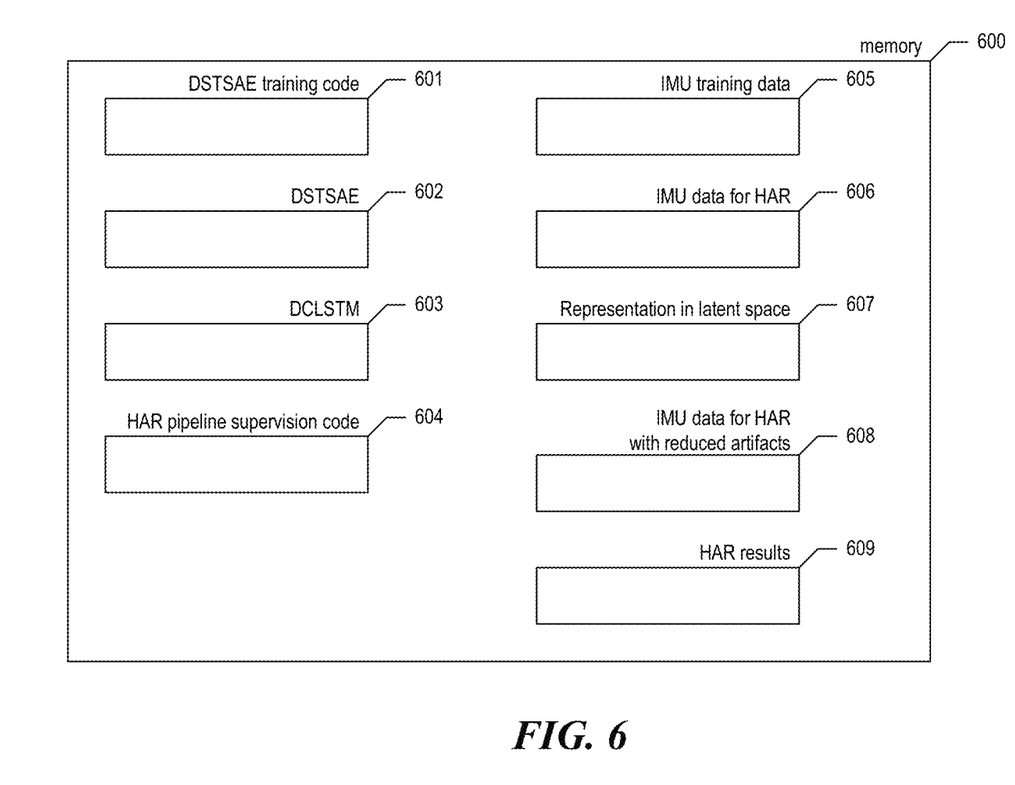
FIG. 6 is a data structure diagram showing data and/or code stored by the facility in some embodiments.

FIG. 6 is a data structure diagram showing data and/or code stored by the facility in some embodiments. The drawing shows a memory 600 containing code 601 for training a DSTSAE or other artifact-reduction neural network. The memory further contains content 602 of the artifact-reduction neural network, including both its general structure and the state of the neural network produced by training it. The memory also contains content of the DCL-STM, or other neural network or mechanism for performing HAR. Again, these contents include both the structure of this neural network and the state of the neural network determined by training it. The memory also includes code 604 for supervising the processing of sensor data to first reduce the artifacts in it, and then perform HAR on it. The memory also contains sensor data 605 used to train the artifact-reduction neural network, and/or the neural network used to perform HAR. The memory also contains sensor data 606 on which HAR is to be performed. The memory also contains data constituting the representation of sensor data 606 in latent space produced by the first portion of the artifact-reduction neural network. The memory further contains a version 608 of the sensor data in which artifacts have been reduced by applying the second portion of the artifact-reduction neural network to the representation in latent space produced by the first portion of the artifact-reduction neural network. The memory further contains HAR result 609 identifying the human activities whose performance by the subject is reflected in the sensor data, in some cases along with indications of the time indices at which these activities are performed.

IMU Sensor data can potentially be represented by specific pieces of information like pose transitions in time, sensor location on the body, limb-orientation patterns, etc. While there is some understanding of how these features are related to the time-domain IMU samples, handcrafting a relevant representation with these features remains a challenge. Rather than pursuing this approach, however, the facility models and learns from sensor data. In particular, in some embodiments, the facility uses a probabilistic generative model as follows:

$$p_\theta(x,z) = p_\theta(x|z)p(z) \qquad (1)$$

where likelihood $p_\theta(x|z)$ quantifies how the observed IMU samples x are related to a hidden random variable z, while the prior $p(z)$ quantifies what is known about z before seeing any samples. Given this representation model, the facility uses the posterior $p_\theta(z|x)$ to infer z and find parameters θ that maximize the marginalized likelihood $p_\theta(x|z)$, which along with $p(x)$ is assumed to belong to a parametric family of distributions.

By defining the prior distribution to be something simple (much simpler than the time-domain IMU data distribution), the facility ensures that z captures a more noise-robust representation. Accordingly, the facility uses a unit-Gaussian prior as follows:

$$p(z) = N(0,I) \qquad (2)$$

For the observation or decoder model, i.e., the likelihood function $p_\theta(x|z)$, the facility uses $$p_\theta(x|z) = N(\mu_{74}(z), \sigma_\theta^2(z)I) \qquad (3)$$

As in the variational auto-encoder (VAE) framework, the facility represents the latent parameters, mean $\mu_\theta(z)$ and variance $\sigma_\theta^2(z)$, with a neural network. Specifically, the facility uses a stack of convolutional neural-network layers ("Conv2D"), followed by a sequence of LSTM units. The wide-receptive fields in Conv2Ds and connected storage cells in LSTMs capture the spatial (e.g., location of active sensors and covariance between different sensor types) and temporal (e.g., pose transitions) relationships in the IMU data samples, respectively.

For the recognition or encoder model, the facility uses the theory of variational inference to approximate the posterior $p_\theta(z|x)$ with a tractable auxiliary distribution as follows:

$$q_\theta(z|x) = N(\mu_\phi(x), \sigma_\phi^2(x)) \qquad (4)$$

Following an approach that is an inverse of the encoding process, the facility uses a sequence of LSTM units followed by a stack of deconvolutional layers (Deconv2D) for the recognition model. The resulting end-to-end approach is referred to as the deconvolutional sequence-to-sequence autoencoder ("DSTSAE").

Figure 7:
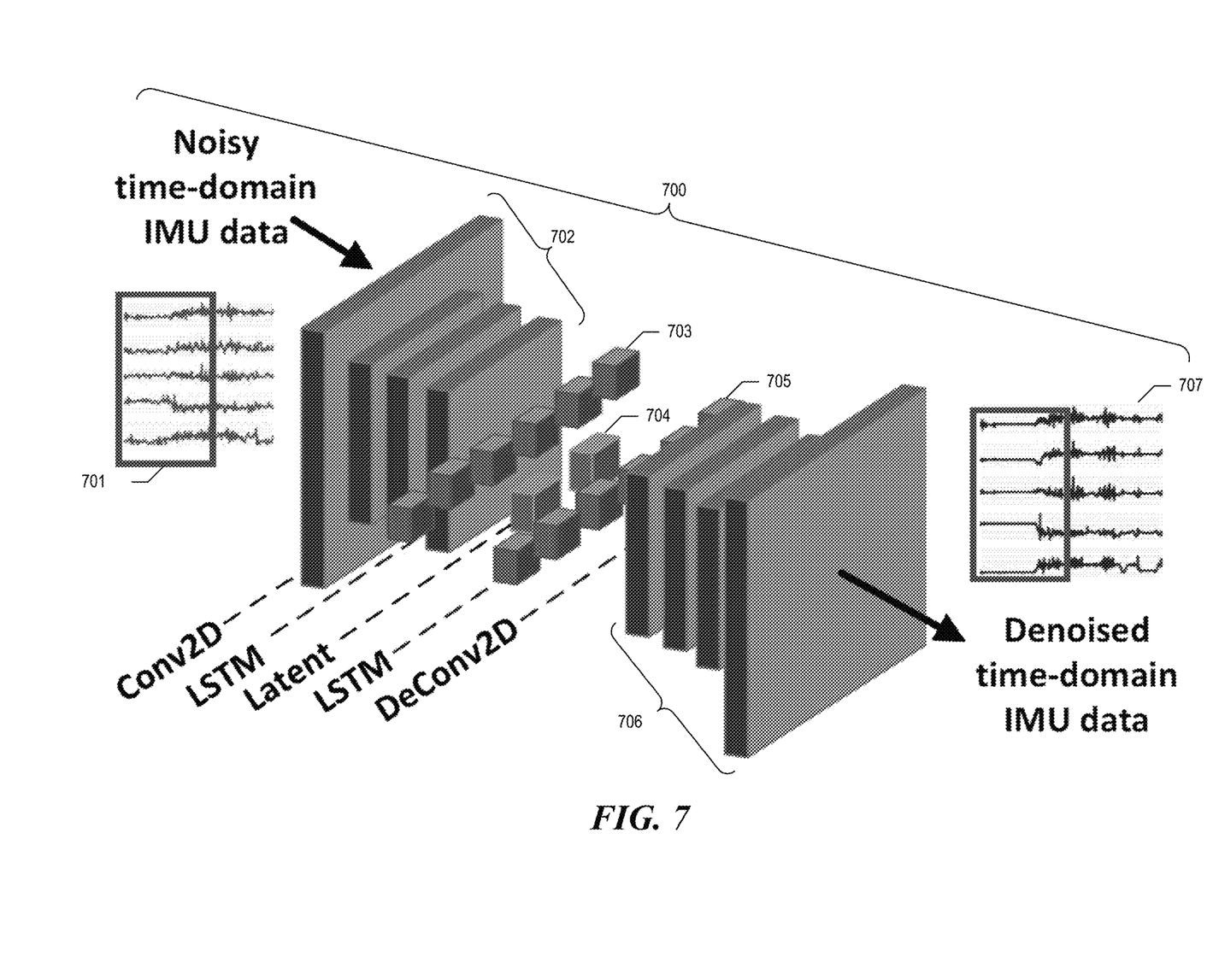
FIG. 7 is a neural network architecture diagram showing a DSTSAE artifact-reduction neural network trained and applied by the facility in some embodiments.

FIG. 7 is a neural network architecture diagram showing a DSTSAE artifact-reduction neural network trained and applied by the facility in some embodiments. In the DSTSAE 700, original time-series sensor data 701 is first processed by convolutional neural-network layers 702, then by encoding long short-term memory units 703 to obtain a representation 704 of the sensor data in latent space. The facility processes this representation through encoding LSTM units 705, then through deconvolutional neural-network layers 706, to obtain a version 707 of the time-series sensor data in which artifacts and/or noise has been reduced.

Figure 8:
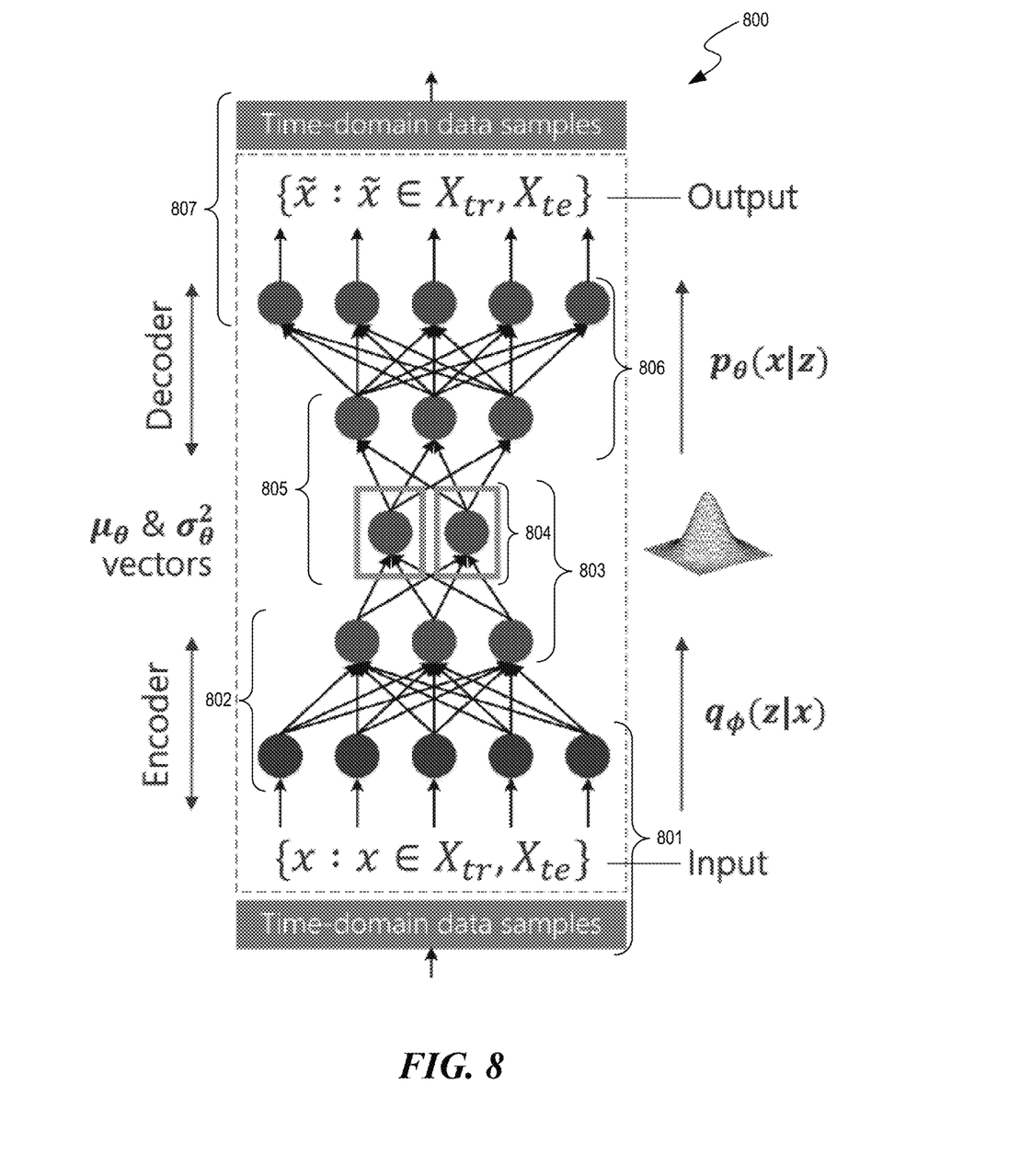
FIG. 8 is a second neural network architecture drawing showing the organization of a DSTSAE used by the facility in some embodiments as an artifact-reduction neural network.

FIG. 8 is a second neural network architecture drawing showing the organization of a DSTSAE used by the facility in some embodiments as an artifact-reduction neural network. In the DSTSAE 800, original sensor data 801 is subjected to an encoder portion—made up of convolutional CNN 802 and encoding LSTM 803—to obtain the representation 804 in latent space. To this representation, the facility applies the decoder portion of the DSTSAE—made up of decoding LSTM 805 and deconvolutional CNN 806—to obtain a version 807 of the time-series sensor data in which artifacts and/or noise are reduced.

To train the parameters of DSTSAE, the facility uses a weighted-variant of the standard VAE loss function as follows:

$$L(\theta,\phi;x) = \alpha \cdot E_{q_\phi(z|x)}[\log p_\theta(x|z)] - (1-\alpha) \cdot D_{KL}[q_\phi(z|x) \| p(z)] \quad (5)$$

where $\alpha$ and $(1-\alpha)$ are weights for the generative loss (or reconstruction quality characterized by the expectation term $E[\cdot]$) and latent loss (or distribution similarity characterized by the Kullback-Leibler divergence $D_{KL}[\cdot]$), respectively. These terms enable the facility to trade the accuracy of reconstructing IMU training data with the generalizability of the signal model. Naturally, more generalizable the signal-representation model, more robust it is to the presence of motion artifacts. However, this comes at the cost of losing fidelity with the training IMU data. Therefore, in some embodiments, the facility carefully balances these terms for the best performance.

In some embodiments, the DSTSAE uses four Conv2D and four DeConv2D layers with rectified linear unit (ReLU) activations and 32×5 kernels. In some embodiments, on the first and the last layers, the DSTSAE uses a stride size of 4. In some embodiments, the DSTSAE uses one stateless 64-unit LSTM layer each in the encoder and the decoder along with dropout layers with a p-value of 0.5. In some embodiments, the DSTSAE uses RMSProp with parameters $\rho=0.9$ and $\in=10^8$. In some embodiments, the facility trains DSTSAE and DAE models with five different loss weights in batch sizes of 1024 for 120 epochs. In some embodiments, the facility uses of a weight-decay schedule and an early-stop callback interrupt.

In some embodiments, the DSTSAE represents IMU data efficiently with a compact set of latent parameters: mean $\mu_\theta(z)$ and variance $\sigma_\theta^2(z)$, shown in Eq. (3).

Figure 9:
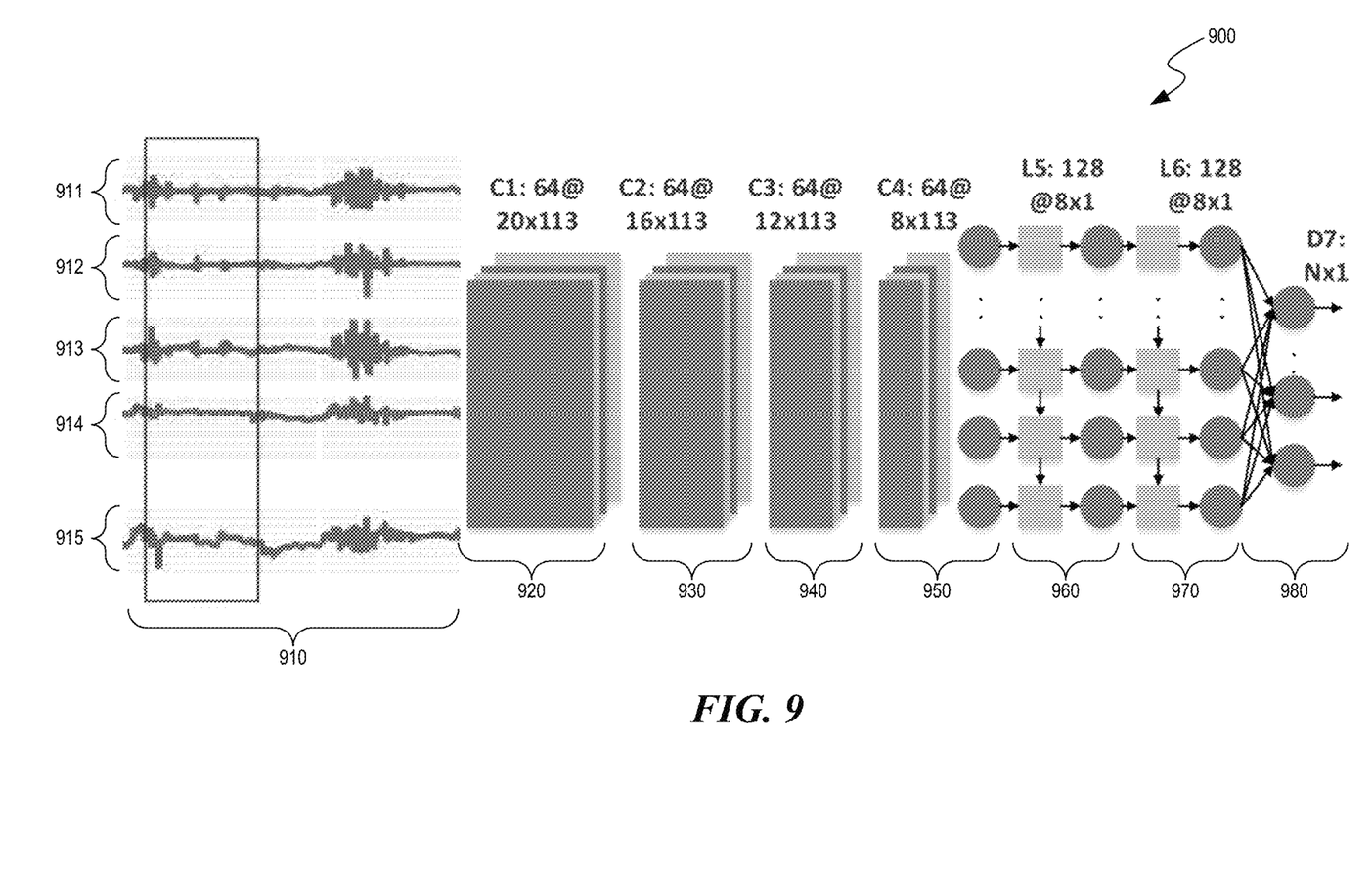
FIG. 9 is a neural network architecture diagram showing a DCLSTM neural network used by the facility in some embodiments to perform HAR on sensor data processed by the facility to reduce and/or other noise.

FIG. 9 is a neural network architecture diagram showing a DCLSTM neural network used by the facility in some embodiments to perform HAR on sensor data processed by the facility to reduce and/or other noise. In the diagram, the neural network 900 acts on original time-series sensor data 910, made up of individual channels, such as channels 911, 912, 913, 914, and 915, in some embodiments each corresponding to a different sensor, or a different one of multiple outputs of different sensors. In some embodiments, a sliding time window is used to apply the DCLSTM, in multiple iterations, to all of the sensor data samples that are in the window in each position of its transit through the time index range of the data, yielding outputs that reflect activities likely to occur at each point in the window's transit. The set of data samples in a particular position of the window is processed by a series of four convolutional layers, then two dense, long short-term memory layers to produce outputs identifying activities likely to have been performed during the current position of the window. The convolutional layers 920, 930, 940, and 950 learn features from the data, while the LSTM layers 960 and 970 perform a non-linear transformation to yield, via a softmax logistic regression output layer 980, the activity classification outcome. Convolutional layers 920, 930, 940, and 950 each have 64 feature maps. These convolution neural networks are sized at the number of data channels (shown here as 113) by the length of the feature map in the convolutional network, reducing from a length of 20 in the first convolutional neural network to a length of 8 in the fourth convolutional neural network. Each of LSTM layers 960 and 970 has 128 LSTM units operating on 8×1 size input. The fully-connected softmax layer 980 operates on input that is sized to correspond to the number of candidate activities that are being recognized. The DCLSTM produces an output for each activity indicating the probability that it occurred during the current time window.

In various embodiments, the facility recognizes activities among various sets of candidate activities. Tables 1 and 2 below contain sample sets of candidate activities recognized by the facility in some embodiments. Those skilled in the art will appreciate that various other sets of candidate activities of various types may be used.

TABLE 1

Gesture Activities write on notepad
open hood
close hood
check gaps on the front door
open left front door
close left front door
close both left door
check trunk gaps
open and close trunk
check steering wheel
none

TABLE 2

Locomotion Activities stand
walk
sit
lie
none

In various embodiments, the facility applies an artifact-reduction neural network to the signals from IMUs and/or sensors of other types to prepare the sensor data for various other kinds of automated inference, or analysis of various other types. As one example, in some embodiments, the facility processes sensor data as a basis for automatically diagnosing medical conditions, such as Parkinson's disease, multiple sclerosis, stroke, traumatic brain injury, neural degenerative diseases, etc. In some embodiments, the facility is used to process data for human, other animal, robotic, or vehicular location-, orientation-, and/or and pose-finding and/or guidance.

In some embodiments, the facility provides a method in a computing system for processing output from a network of sensors positioned to report on motion of a subject, the method comprising: accessing time-series data outputted by the network of sensors; applying to the accessed time-series data a trained variational autoencoder to obtain a version of the accessed time-series data in which motion artifacts introduced by the positioning of the sensors of the network relative to the subject are at least partially suppressed; and storing the obtained version of the accessed time-series data.

In some embodiments, the facility provides one or more memories collectively storing contents configured to cause a computing system to perform a method for processing output from a network of sensors positioned to report on motion of a subject, the method comprising: accessing time-series data outputted by the network of sensors; applying to the accessed time-series data a trained variational autoencoder to obtain a version of the accessed time-series data in which motion artifacts introduced by the positioning of the sensors of the network relative to the subject are at least partially suppressed; and storing the obtained version of the accessed time-series data.

In some embodiments, the facility provides a system for processing output from a network of sensors positioned to report on motion of a subject, comprising: a processor; and a memory having contents configured to, when executed by the processor, cause the system to perform a method for processing output from a network of sensors positioned to report on motion of a subject, the method comprising: accessing time-series data outputted by the network of sensors; applying to the accessed time-series data a trained variational autoencoder to obtain a version of the accessed time-series data in which motion artifacts introduced by the positioning of the sensors of the network relative to the subject are at least partially suppressed; and storing the obtained version of the accessed time-series data.

In some embodiments, the facility provides one or more memories collectively storing contents configured to cause a computing system to perform a method for processing output from a network of mechanical sensors, the method comprising: accessing time-series data outputted by the network of sensors; applying to the accessed time-series data a trained autoencoder to obtain a version of the accessed time-series data in which noise present in the accessed time-series data is at least partially suppressed; and storing the obtained version of the accessed time-series data.

In some embodiments, the facility provides a method in a computing system for processing output from a network of mechanical sensors, the method comprising: accessing time-series data outputted by the network of sensors; applying to the accessed time-series data a trained autoencoder to obtain a version of the accessed time-series data in which noise present in the accessed time-series data is at least partially suppressed; and storing the obtained version of the accessed time-series data.

In some embodiments, the facility provides a system for processing output from a network of sensors positioned to report on motion of a subject, comprising: a processor; and a memory having contents configured to, when executed by the processor, cause the system to perform a method for processing output from a network of mechanical sensors, the method comprising: accessing time-series data outputted by the network of sensors; applying to the accessed time-series data a trained autoencoder to obtain a version of the accessed time-series data in which noise present in the accessed time-series data is at least partially suppressed; and storing the obtained version of the accessed time-series data.

In some embodiments, the facility provides one or more memories collectively storing a data structure containing a representation of data from a free-mode body sensor network having a plurality of channels each corresponding to a different sensor of the free-mode body sensor network, the data structure comprising: for each of the plurality of channels, a time-series of signal levels, wherein the time-series of signal levels of which the data structure is comprised were produced by subjecting the channels of data from the free-mode body sensor network to a variational autoencoder trained on previous output of the free-mode body sensor network.

It will be appreciated by those skilled in the art that the above-described facility may be straightforwardly adapted or extended in various ways. While the foregoing description makes reference to particular embodiments, the scope of the invention is defined solely by the claims that follow and the elements recited therein.

We claim:

1. A method in a computing system for processing output from a network of sensors positioned to report on motion of a subject, the method comprising:
   accessing time-series data outputted by the network of sensors;
   applying to the accessed time-series data a trained variational autoencoder to obtain a version of the accessed time-series data in which noise present in the accessed time-series data is suppressed and motion artifacts introduced by the positioning of the sensors of the network relative to the subject are suppressed, wherein the applied trained variational autoencoder comprises a neural network in which a first plurality of layers comprise a spatial component of the autoencoder, the first plurality of layers including a stack of convolutional neural network layers followed by a sequence of long short-term memory units and used to obtain a representation of the accessed time-series data in latent space, a second plurality of layers distinct from the first plurality of layers comprise a temporal component of the autoencoder, and the second plurality of layers including a sequence of long short-term memory units followed by a stack of deconvolutional layers with at least one rectified linear unit and used to obtain the version of the accessed time-series data in which the noise and motion artifacts has been suppressed; and
   storing the obtained version of the accessed time-series data.

2. The method of claim 1, further comprising receiving the time-series data from the network of sensors, which is incorporated into clothing worn by a human subject.

3. The method of claim 1, further comprising training the variational autoencoder.

4. The method of claim 3 wherein the variational autoencoder has a latent space representation, the training of the variational autoencoder comprises progressively adjusting configuration parameters of the variational autoencoder to induce its latent space representation to be more similar to an arbitrary pre-specified distribution.

5. The method of claim 3 wherein the variational autoencoder has a latent space representation, the training of the variational autoencoder is performed in accordance with a generative loss term and a latent loss term, and wherein the latent loss term is accorded approximately three times as much weight as the generative loss term.

6. The method of claim 1, further comprising performing human activity recognition against the obtained version of the accessed time-series data to obtain predictions of performed human activities reflected by the accessed time-series data.

7. The method of claim 1 wherein the accessed time-series data comprises a plurality of channels each corresponding to a particular sensor in the network of sensors, the method further comprising:
   accessing a list of channels to be omitted in the training of the variational auto encoder; and
   omitting from the accessed time-series data the channels that correspond to the accessed list of channels to be omitted in the training of the variational auto encoder.

8. One or more memories collectively storing contents configured to cause a computing system to perform a method for processing output from a network of mechanical sensors, the method comprising:
   accessing time-series data outputted by the network of sensors;
   applying to the accessed time-series data a trained autoencoder to obtain a version of the accessed time-series data in which noise present in the accessed time-series data is suppressed and motion artifacts introduced by positioning of the sensors of the network relative to the subject are suppressed, wherein the applied trained autoencoder comprises a neural network in which a first plurality of layers comprise a spatial component of the autoencoder, the first plurality of layers including a stack of convolutional neural network layers followed by a sequence of long short-term memory units and used to obtain a representation of the accessed time-series data in latent space, a second plurality of layers distinct from the first plurality of layers comprise a temporal component of the autoencoder, and the second plurality of layers including a sequence of long short-term memory units followed by a stack of deconvolutional layers with at least one rectified linear unit and used to obtain the version of the accessed time-series data in which the noise and motion artifacts has been suppressed; and
   storing the obtained version of the accessed time-series data.

9. The memories of claim 8, the method further comprising receiving the time-series data from the network of sensors.

10. The memories of claim 8, wherein the sequence of long short-term memory units applied to the accessed time-series data is trained for human activity recognition to obtain predictions of performed human activities reflected by the accessed time-series data.

11. The memories of claim 8, the method further comprising training the autoencoder.

12. The memories of claim 11 wherein the autoencoder has a latent space representation, the training of the autoencoder comprises progressively adjusting configuration parameters of the autoencoder to induce its latent space representation to be more similar to an arbitrary pre-specified distribution.

13. The memories of claim 11 wherein the autoencoder has a latent space representation, the training of the autoencoder is performed in accordance with a generative loss term and a latent loss term, and wherein the latent loss term is accorded approximately three times as much weight as the generative loss term.

14. A system comprising:
   one or more memories storing instructions for processing output from a free-mode body sensor network; and
   a processor configured to execute the instructions to perform a method comprising:
      accessing time-series data outputted from the free-mode body sensor network;
      applying to accessed time-series data a trained variational autoencoder to obtain a version of the accessed time-series data in which noise present in the accessed time-series data is suppressed and motion artifacts introduced by the positioning of the sensors of the free-mode body sensor network relative to the subject are suppressed, wherein the applied trained variational autoencoder comprises a neural network in which a first plurality of layers comprise a spatial component of the autoencoder, the first plurality of layers including a stack of convolutional neural network layers followed by a sequence of long short-term memory units and used to obtain a representation of the accessed time-series data in latent space, a second plurality of layers distinct from the first plurality of layers comprise a temporal component of the autoencoder, and the second plurality of layers including a sequence of long short-term memory units followed by a stack of deconvolutional layers with at least one rectified linear unit and used to obtain the version of the accessed time-series data in which the noise and motion artifacts has been suppressed; and
      storing the obtained version of the accessed time-series data.

15. The system of claim 14, wherein the sequence of long short-term memory units of the first plurality of layers applied to the accessed time-series data is trained for human activity recognition to obtain predictions of performed human activities reflected by the accessed time-series data.

16. The system of claim 14 wherein the time-series comprises information representing a plurality of annotations, each annotation identifying a subrange of a time index range spanned by the time-series data, and identifying a human activity recognized from the time-series data during the identified time index subrange.

17. The system of claim 14 wherein the applied trained variational autoencoder is a deconvolutional sequence-to-sequence autoencoder trained on previous output of the free-mode body sensor network.

18. The system of claim 14 wherein the processor further configured to execute the instructions to perform the method comprising training the autoencoder.

19. The system of claim 18 wherein the autoencoder has a latent space representation, the training of the autoencoder comprises progressively adjusting configuration parameters of the autoencoder to induce its latent space representation to be more similar to an arbitrary pre-specified distribution.

20. The system of claim 18 wherein the autoencoder has a latent space representation, the training of the autoencoder is performed in accordance with a generative loss term and a latent loss term, and wherein the latent loss term is accorded approximately three times as much weight as the generative loss term.

* * * * *